United States Patent
Massa et al.

(10) Patent No.: US 9,029,729 B2
(45) Date of Patent: May 12, 2015

(54) REOPENING OF COOLING-AIR BORES USING A NANOSECOND LASER IN THE MICROSECOND RANGE

(71) Applicants: Andrea Massa, Berlin (DE); Rolf Wilkenhöner, Kleinmachnow (DE); Adrian Wollnik, Berlin (DE)

(72) Inventors: Andrea Massa, Berlin (DE); Rolf Wilkenhöner, Kleinmachnow (DE); Adrian Wollnik, Berlin (DE)

(73) Assignee: Siemens Aktiengesellschaft, München (DE)

( * ) Notice: Subject to any disclaimer, the term of this patent is extended or adjusted under 35 U.S.C. 154(b) by 341 days.

(21) Appl. No.: 13/713,100

(22) Filed: Dec. 13, 2012

(65) Prior Publication Data

US 2013/0153548 A1    Jun. 20, 2013

(30) Foreign Application Priority Data

Dec. 15, 2011    (EP) .................................... 11193809

(51) Int. Cl.
| | |
|---|---|
| *B23K 26/388* | (2014.01) |
| *B23K 26/38* | (2014.01) |
| *B21D 53/78* | (2006.01) |

(52) U.S. Cl.
CPC ............ *B23K 26/388* (2013.01); *B23K 26/381* (2013.01); *B23K 26/38* (2013.01); *B21D 53/78* (2013.01); *B23K 2201/001* (2013.01)

(58) Field of Classification Search
CPC .... B23K 26/38; B23K 26/381; B23K 26/388; B21D 53/78
USPC ............ 219/121.68–121.71, 121.61, 121.85; 29/889.2, 889.721; 427/243, 247; 416/241 R–241 B See application file for complete search history.

(56) References Cited

U.S. PATENT DOCUMENTS

| | | | | |
|---|---|---|---|---|
| 5,113,582 | A * | 5/1992 | Monson et al. | ............... 29/889.2 |
| 6,024,792 | A | 2/2000 | Bieler | |
| 8,437,010 | B2 * | 5/2013 | Bostanjoglo et al. | ......... 356/602 |
| 8,857,055 | B2 * | 10/2014 | Wei et al. | ................. 29/889.721 |
| 2007/0241084 | A1 | 10/2007 | Fehrmann | |
| 2008/0085395 | A1 | 4/2008 | Fernihough | |
| 2008/0197120 | A1 | 8/2008 | Beck | |

FOREIGN PATENT DOCUMENTS

| | | |
|---|---|---|
| DE | 10063309 A1 | 7/2002 |
| EP | 0486489 B1 | 11/1994 |
| EP | 0412397 B1 | 3/1998 |
| EP | 0892090 A1 | 1/1999 |
| EP | 0786017 B1 | 3/1999 |
| EP | 1306454 A1 | 5/2003 |
| EP | 1319729 A1 | 6/2003 |
| EP | 1204776 B1 | 6/2004 |
| WO | WO 9967435 A1 | 12/1999 |
| WO | WO 0044949 A1 | 8/2000 |

\* cited by examiner

*Primary Examiner* — Samuel M Heinrich

(57) ABSTRACT

A process for reopening cooling-air holes by a laser in order to remove coat down is provided. A nanosecond laser is provided and used for reopening the holes, wherein pulse times between 1 µs and 20 µs and a pulse frequency between 20 kHz and 40 kHz provided by the nanosecond laser are used.

10 Claims, 2 Drawing Sheets

FIG 3

| Werkstoff | C | Cr | Ni | Co | Mo | W | Ta | Nb | Al | Ti | B | Zr | Hf |
|---|---|---|---|---|---|---|---|---|---|---|---|---|---|
| Ni-Basis-Feingußlegierungen | | | | | | | | | | | | | |
| GTD 222 | 0.10 | 22.5 | Rest | 19.0 | | 2.0 | 1.0 | | 1.2 | 2.3 | 0.008 | | |
| IN 939 | 0.15 | 22.4 | Rest | 19.0 | | 2.0 | 1.4 | 1.0 | 1.9 | 3.7 | 0.009 | 0.10 | |
| IN 6203 DS | 0.15 | 22.0 | Rest | 19.0 | | 2.0 | 1.1 | 0.8 | 2.3 | 3.5 | 0.010 | 0.10 | 0.75 |
| Udimet 500 | 0.10 | 18.0 | Rest | 18.5 | 4.0 | | | | 2.9 | 2.9 | 0.006 | 0.05 | |
| IN 738 LC | 0.10 | 16.0 | Rest | 8.5 | 1.7 | 2.6 | 1.7 | 0.9 | 3.4 | 3.4 | 0.010 | 0.10 | |
| SC 16 | <0.01 | 16.0 | Rest | | 3.0 | | 3.5 | | 3.5 | 3.5 | <0.005 | <0.008 | |
| Rene 80 | 0.17 | 14.0 | Rest | 9.5 | 4.0 | 4.0 | | | 3.0 | 5.0 | 0.015 | 0.03 | |
| GTD 111 | 0.10 | 14.0 | Rest | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rest | 9.0 | 1.9 | 4.1 | 4.1 | | 3.4 | 3.8 | 0.015 | 0.02 | |
| IN 792 DS | 0.08 | 12.5 | Rest | 9.0 | 1.9 | 4.1 | 4.1 | | 3.4 | 3.8 | 0.015 | 0.02 | 1.00 |
| MAR M 002 | 0.15 | 9.0 | Rest | 10.0 | | 10.0 | 2.5 | | 5.5 | 1.5 | 0.015 | 0.05 | 1.50 |
| MAR M 247 LC DS | 0.07 | 8.1 | Rest | 9.2 | 0.5 | 9.5 | 3.2 | | 5.6 | 0.7 | 0.015 | 0.02 | 1.40 |
| CMSX-2 | <.006 | 8.0 | Rest | 4.6 | 0.6 | 8.0 | 6.0 | | 5.6 | 1.0 | <.003 | <.0075 | |
| CMSX-3 | <.006 | 8.0 | Rest | 4.6 | 0.6 | 8.0 | 6.0 | | 5.6 | 1.0 | <.003 | <.0075 | 0.10 |
| CMSX-4 | | 6.0 | Rest | 10.0 | 0.6 | 6.0 | 6.0 | | 5.6 | 1.0 | | Re=3.0 | 0.10 |
| CMSX-6 | <.015 | 10.0 | Rest | 5.0 | 3.0 | <.10 | 2.0 | <.10 | 4.9 | 4.8 | <.003 | <.0075 | 0.10 |
| PWA 1480 SX | <.006 | 10.0 | Rest | 5.0 | | 4.0 | 12.0 | | 5.0 | 1.5 | <.0075 | | |
| PWA 1483 SX | 0.07 | 12.2 | Rest | 9.0 | 1.9 | 3.8 | 5.0 | | 3.6 | 4.2 | 0.0001 | 0.002 | |
| Co-Basis-Feingußlegierungen | | | | | | | | | | | | | |
| FSX 414 | 0.25 | 29.0 | 10 | Rest | | 7.5 | | | | | 0.010 | | |
| X 45 | 0.25 | 25.0 | 10 | Rest | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rest | | 7.5 | 4 | | | 0.3 | 0.010 | 0.60 | |
| CM 247 | 0.07 | 8.3 | Rest | 10.0 | 0.5 | 9.5 | 3.2 | | 5.5 | 0.7 | | | 1.5 | chemische Zusammensetzung in %

REOPENING OF COOLING-AIR BORES USING A NANOSECOND LASER IN THE MICROSECOND RANGE

CROSS REFERENCE TO RELATED APPLICATIONS

This application claims priority of European Patent Application No. 11193809.8 EP filed Dec. 15, 2011. All of the applications are incorporated by reference herein in their entirety.

FIELD OF INVENTION

A process of reopening through-bores, which have been at least partially blocked during coating, by a nanosecond laser in a microsecond range is provided.

BACKGROUND OF INVENTION

High-temperature components, e.g. turbine blades or vanes, are actively cooled and therefore have cylindrical and/or shaped cooling-air holes with a diffuser at the surface.

When reusing the turbine blades or vanes, wherein a coating is removed from the turbine blades or vanes and a new coating is applied, the cooling-air holes which are already present may in some cases become blocked. The coating in the holes and in the diffuser (coat down) has to be removed, which is often carried out by means of a special EDM electrode.

SUMMARY OF INVENTION

An object is to provide a quicker process of reopening the holes/bores. The object is achieved by a process as claimed in the independent claim. The dependent claims list further advantageous measures which may be combined with one another, as desired, in order to achieve further advantages.

BRIEF DESCRIPTION OF THE DRAWINGS

FIG. 3 shows a list of superalloys.

The description and the figures represent merely exemplary embodiments of the invention.

DETAILED DESCRIPTION OF INVENTION

Figure 1:
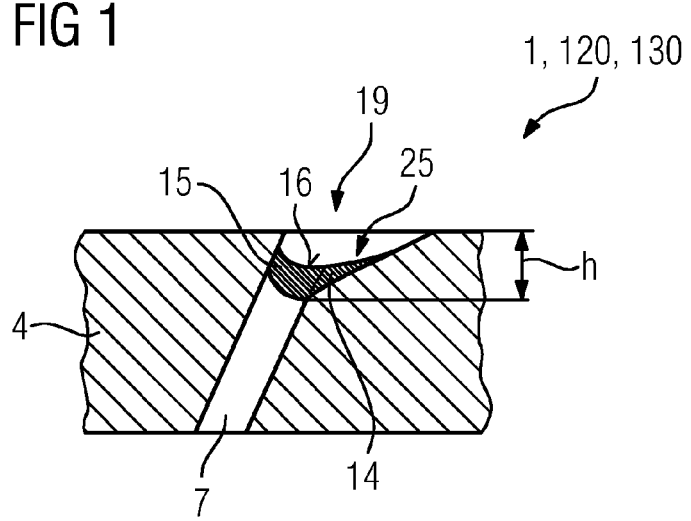
FIG. 1 shows a cooling-air hole with a blockage.

FIG. 1 shows a component 1 (120, 130) with a cooling-air hole 19 present on a cylindrical portion 7, where in the case of some cooling-air holes 19 there is also a diffuser 25 from a certain depth h in the region of the surface, which diffuser 25 represents a considerable widening of the cylindrical portion 7.

The described method relates to completely cylindrical bores 7 and cylindrical bores 7 with a diffuser 25 (shapes).

Shown is a coat down 15 in the cylindrical part 7 and a coat down 14 in the diffuser 25 of the hole 19, which means coating material in the hole 19. The hole 19 may be blocked completely (see FIG. 1) or only in parts, like a constriction of the cross section (not shown). The depth of the coat down 15 down to the depth h is shown merely by way of example. It may lie there above or there below.

It is preferable to use an ablation laser. This is preferably a nanosecond laser, i.e. a laser which provides pulse lengths in the nanosecond range (≤500 ns).

The power of the laser is preferably 180 W-200 W, wherein a pulse duration of 1 µs-20 µs, in particular 5 µs-20 µs, very particularly 10 µs, is used.

The frequency is preferably in the range of 20 kHz-40 kHz, in particular 30 kHz.

The laser beam (or generally high-energy beam, not shown) is moved over the surface 16 of the coat down 14/15 at a feed rate of 200 mm/s-300 mm/s, very preferably 250 mm/s.

The region 14, 15 to be removed is removed in layers, which applies to the coat down 15 in the cylindrical portion 7 and the coat down 14 in the diffuser 25. In this case, it is also preferable to shift the focus position from a layer removed to a layer to be removed.

If a diffuser 25 is present, the coat down 14 in the diffuser 25 is only then removed therefrom. This is then effected by a nanosecond laser, where in this case use is made of the same laser parameters as for the removal of the coat down 15 from the cylindrical portion 7.

Pulse times of less than 800 ns, in particular of less than 600 ns, can similarly be used with preference for the coat down 14 in the diffuser 25. The minimum pulse time is then 100 ns for the removal of material 14 from the diffuser 25.

Either ceramic coat down 14, 15 or metallic coat down 14, 15 or ceramic coat down 14, 15 arranged on metallic coat down 14, 15 is removed.

Therefore, the particular advantage upon reopening shapes is that with a laser, here a nanosecond laser, which is used in new production of for example a blade or vane, it is possible to reopen a shape without having to use a second laser apparatus.

Figure 2:
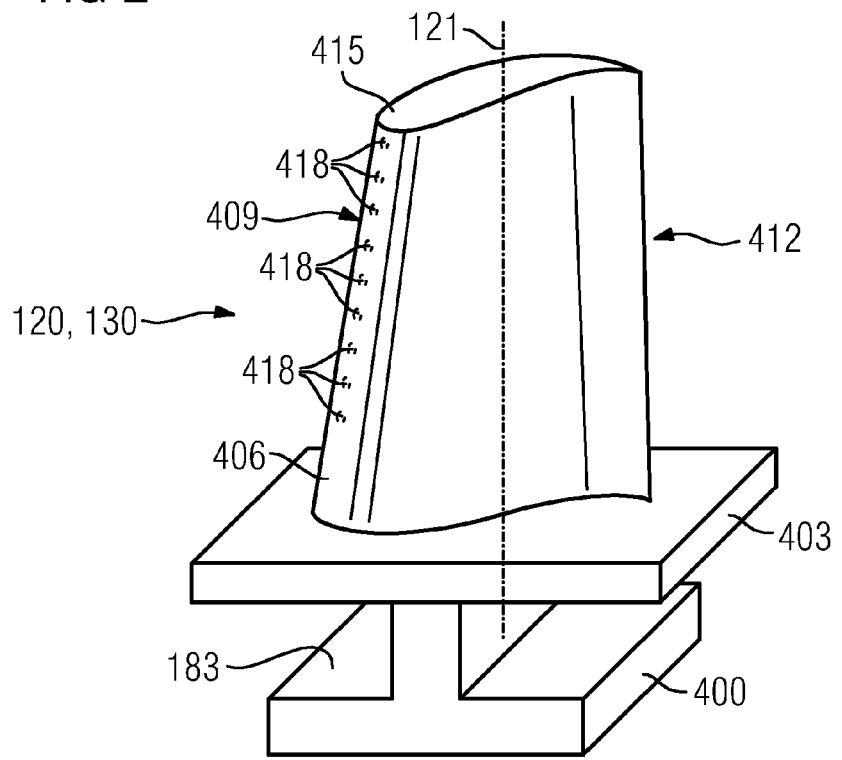
FIG. 2 shows a turbine blade or vane.

FIG. 2 shows a perspective view of a rotor blade 120 or guide vane 130 of a turbomachine, which extends along a longitudinal axis 121. The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415. A blade or vane root 183, which is used to secure the rotor blades 120, 130 to a shaft or a disk (not shown), is formed in the securing region 400. The blade or vane root 183 is designed, for example, in hammerhead form. Other configurations, such as a fir-tree or dovetail root, are possible. The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses. Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures). Processes of this type are known from U.S. Pat. No. 6,024,792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf). Alloys of this type are known from EP 0 486 489 B1, EP 0 786 017 B1, EP 0 412 397 B1 or EP 1 306 454 A1.

The density is preferably 95% of the theoretical density. A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer, to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide. The thermal barrier coating covers the entire MCrAlX layer. Columnar grains are produced in the thermal barrier coating by suitable coating processes, such as for example electron beam physical vapor deposition (EBPVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

Refurbishment means that after they have been used, protective layers may have to be removed from components 120, 130 (e.g. by sand blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A process for reopening cooling-air holes by a laser in order to remove coat down, comprising:
   providing and using a nanosecond laser, and
   opening holes with the nanosecond laser in order to remove coating material,
   wherein pulse times between 1 µs and 20 µs and a pulse frequency between 20 kHz and 40 kHz, provided by the nanosecond laser, are used.

2. The process as claimed in claim 1, wherein pulse times of 10 µs are used.

3. The process as claimed in claim 1, wherein a pulse frequency of 30 kHz is used.

4. The process as claimed in claim 1, wherein a laser power between 180 W and 200 W is used.

5. The process as claimed in claim 1, wherein the nanosecond laser is an ablation laser, and wherein the ablation laser is moved over a surface to be removed at a feed rate of between 200 mm/s and 300 mm/s, in particular at 250 mm/s.

6. The process as claimed in claim 1, wherein a cylindrical part is cleared away from a first coat down, and wherein a diffuser region is cleared away from a second coat down.

7. The process as claimed in claim 6, wherein the nanosecond laser is used with pulse times of less than 800 ns, in particular less than 600 ns, for removal of the second coat down from the diffuser region.

8. The process as claimed in claim 6, wherein the nanosecond laser is used with identical laser parameters for removal of the first coat down from the cylindrical part and for removal of the second coat down from the diffuser region.

9. The process as claimed in claim 6, wherein the first and/or second coat downs are removed in layers.

10. The process as claimed in claim 6, wherein metallic and/or ceramic coat downs are removed.

* * * * *